United States Patent [19]

Meyer

[11] Patent Number: 5,449,097
[45] Date of Patent: Sep. 12, 1995

[54] CONTROLLED VOLUME DISPENSING MUG

[76] Inventor: Dennis F. Meyer, 381 Lunar La., Bismarck, N. Dak. 58501

[21] Appl. No.: 291,718

[22] Filed: Aug. 17, 1994

[51] Int. Cl.6 .................................................. G01F 11/28
[52] U.S. Cl. ................................... 222/450; 222/456; 222/500
[58] Field of Search ............... 222/441, 444, 450, 455, 222/456, 476, 477; 215/114

[56] References Cited

U.S. PATENT DOCUMENTS

| | | | |
|---|---|---|---|
| 252,519 | 1/1882 | Righter et al. | 222/454 |
| 298,778 | 5/1884 | Rogers, Jr. | 222/456 |
| 467,176 | 1/1892 | Jensen | 222/456 |
| 532,630 | 1/1895 | Baird | 222/500 |
| 1,555,591 | 9/1924 | Larrison | 222/500 |
| 1,710,517 | 4/1929 | Simons | 222/456 |
| 2,043,478 | 3/1935 | Fine | 222/456 |
| 2,306,309 | 12/1942 | Hall | 222/450 |
| 2,645,388 | 7/1953 | Hester | 222/454 |
| 2,877,917 | 8/1956 | Brooks et al. | 215/11.1 |
| 3,044,650 | 8/1959 | Oltion et al. | 215/11.1 |
| 3,129,859 | 7/1960 | Chappell | 222/456 |
| 3,321,113 | 12/1965 | Conry | 222/477 |
| 3,704,803 | 12/1972 | Ponder | 215/11.1 |
| 4,310,038 | 1/1982 | Yule | 222/477 |
| 4,489,859 | 12/1984 | vom Holfe et al. | 222/500 |
| 4,921,112 | 5/1990 | Juhlin et al. | 215/11.4 |
| 4,984,719 | 4/1991 | Brunton | 222/454 |
| 5,044,521 | 9/1991 | Pechels | 222/477 |

*Primary Examiner*—Andres Kashnikow
*Assistant Examiner*—Philippe Derakshani
*Attorney, Agent, or Firm*—Kinney & Lange

[57] ABSTRACT

A drinking mug for dispensing a controlled volume of liquid to a user has a metering chamber with an inlet valve and an outlet valve. The outlet valve utilizing a floating ball which closes the outlet valve after a precise amount of fluid enters the metering chamber. The inlet valve utilizes a ball which sealingly engages the inlet orifice when the mug is tilted past a first angle, thereby preventing additional liquid from entering the metering chamber. As the mug is tipped past the first angle, the buoyancy of the floating ball disengages the ball from the outlet orifice, thereby allowing the fluid in the metering chamber to be dispensed to the user.

18 Claims, 4 Drawing Sheets

CONTROLLED VOLUME DISPENSING MUG

BACKGROUND OF THE INVENTION

The present invention relates to drinking mugs. In particular, the present invention relates to restricted flow drinking mugs used for measuring and dispensing a precise amount of liquid with each operational cycle.

Restricted flow dispensing mugs are known in the art. Such mugs have been used by children, the elderly and those with medical impairments. With each use, the mug provides the user with a limited amount of fluid that is readily ingested. Some designs also prevent an infant from sucking air while being fed with liquid from the mug. These mugs have the further advantage of limiting the amount of liquid which might be spilled if the mug is overturned.

Juhlin et. al., U.S. Pat. No. 4,921,112, discloses a mug for dispensing a measured quantity of liquid. The mug contains a dosing chamber as well as two spherical valve balls. The valve balls work together to allow fluid to flow into the dosing chamber when the mug is upright or tilted at less then a predetermined angle. If the mug is tilted beyond the predetermined angle a lower valve ball seals the dosing chamber so that no more fluid can enter it, and an upper valve ball dislodges from its sealing engagement with the dosing chamber, thereby allowing fluid to flow out of the chamber to the user.

Hester, U.S. Pat. No. 2,645,388, discloses a dispensing device which maybe used to dispense a measured quantity of liquid from a bottle. The dispenser contains a valve ball operating under the force of gravity to control the flow of liquid from the dispenser. The dispenser also contains a floating valve that shuts off flow from the bottle to the dispenser when the dispenser contains a predetermined amount of liquid. Conry, U.S. Pat. No. 3,321,113, and Brunton, U.S. Pat. No. 4,984,719, disclose controlled volume liquid pouring devices. The devices include a tube containing a valve ball. When the dispenser is tilted at an angle, liquid flows through the device while the valve ball travels the length of tube. Upon reaching the end of the tube the valve ball sealingly engages the outlet of the dispenser and thereby prevents any further liquid from flowing from the dispenser.

While the prior art discloses a variety of restricted flow dispensing mugs, a need remains for a mug which can deliver a precise amount of fluid reliably with each use. Imprecise measurements occur in the prior art as a result of the means by which the measuring chambers are filled with liquid. The filling processes are susceptible to air lock within the chamber or to insufficient filling due to the improper use of the mug. For instance, in Juhlin, the dosing chamber is filled as the user tips the mug in preparation for drinking. If the user tips the mug too quickly, the locking valve ball will close to prevent additional fluid from entering the dosing chamber before the dosing chamber has been filled with fluid. The upper valve ball will then release, allowing an insufficient dosage of fluid to flow to the user.

The prior art further fails to provide a design that efficiently uses the volume of liquid available within the mug. Also, a number of designs employ means for obtaining the fluid (e.g., a nipple) which are socially unacceptable in instances such as the feeding of an elderly patient. Additionally, the designs can be inconvenient for certain users having impairments which limit their physical ability.

SUMMARY OF THE INVENTION

The controlled volume dispensing mug of the present invention is a substantially closed mug with an opening in the lid connected to a downward projecting tube. The tube connects to a metering chamber containing two valves, each consisting of a ball and an orifice. The top valve is a floating ball and an orifice which closes after a precise amount of liquid enters the metering chamber. The lower valve is a sinking ball and an orifice which closes when the mug is tipped to an angle such that the ball sealingly engages the orifice, thereby closing the metering chamber. As the tipping angle increases, the buoyancy of the upper ball causes the upper ball to move away from the orifice, thereby opening the top orifice. The encapsulated volume of liquid flows into the connecting tube and out the opening in the lid to the user. The user thus receives a precise amount of liquid. When the mug is returned to an upright position, the filling process in the metering chamber is repeated.

DETAILED DESCRIPTION OF THE PREFERRED EMBODIMENTS

Figure 1:
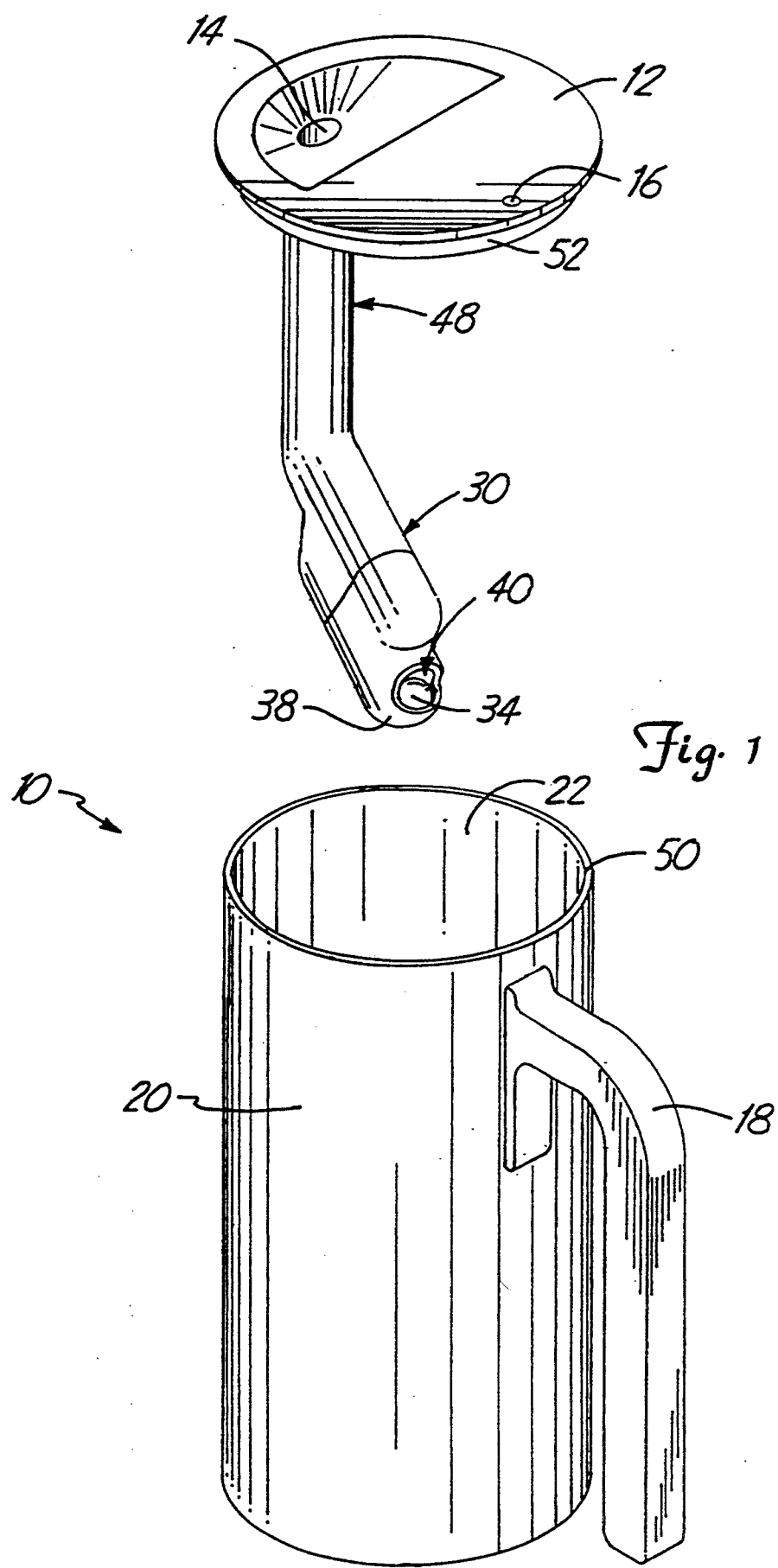
FIG. 1 is a perspective side view of the mug and its associated lid/metering assembly.
Figure 2:
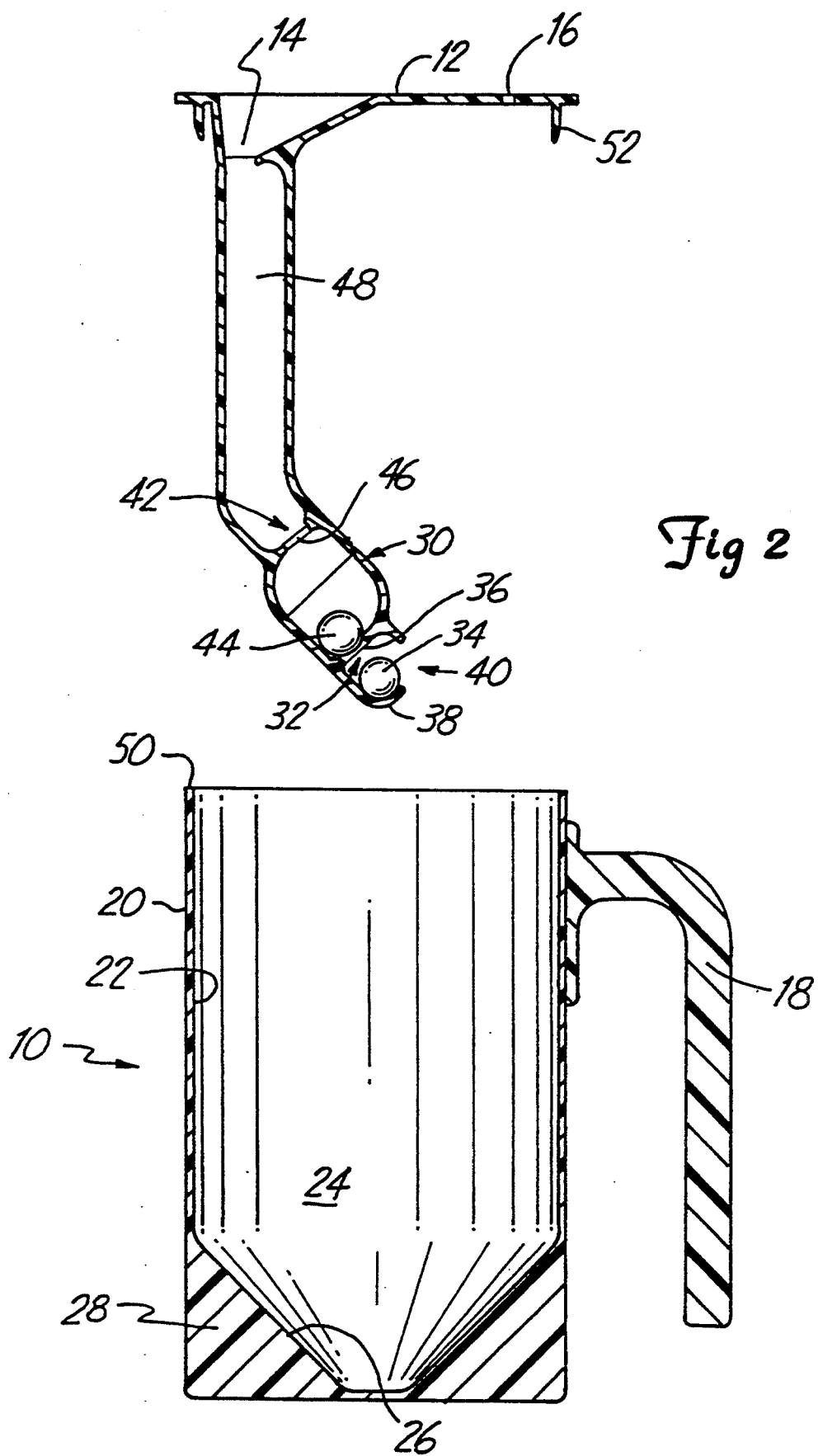
FIG. 2 is an exploded cross-sectional view of the flow channel and metering chamber which fit in the interior of the mug.

FIG. I shows a controlled volume dispensing mug 10. Mug 10 has a lid 12 with an orifice 14 and an air vent hole 16. As shown in FIG. 2, the mug 10 also has a handle 18 which is affixed to an exterior side 20 of the mug 10. Mug 10 includes an interior side 22 with a lower portion 24 and a conical shaped bottom surface 26. Between interior side 22 and exterior side 20 is a thermally insulated region 28.

FIG. 2 shows an exploded cross-sectional view of mug 10. When assembled (FIG. 3), a metering chamber 30 is positioned adjacent bottom surface 26. Metering chamber 30 has a lower valve 32 which consists of a lower valve ball 34 and an inlet orifice 36. Lower valve ball 34 is contained adjacent the inlet orifice 36 by a retaining wall 38. Retaining wall 38 extends about lower valve ball 34, and has an opening 40 which communicates with interior lower portion 24 of mug 10. Opening 40 is sized so as to prevent lower valve ball 34 from falling into interior lower portion 24. Metering chamber 30 also has an upper valve 42 which consists of an upper valve ball 44 and an outlet orifice 46. Outlet orifice 46 opens into a flow channel 48 which extends from the metering chamber 30 to orifice 14 of lid 12. Lid 12 fits over a rim 50 of mug 10 and is frictionally held in place by a lip 52.

Figure 3:
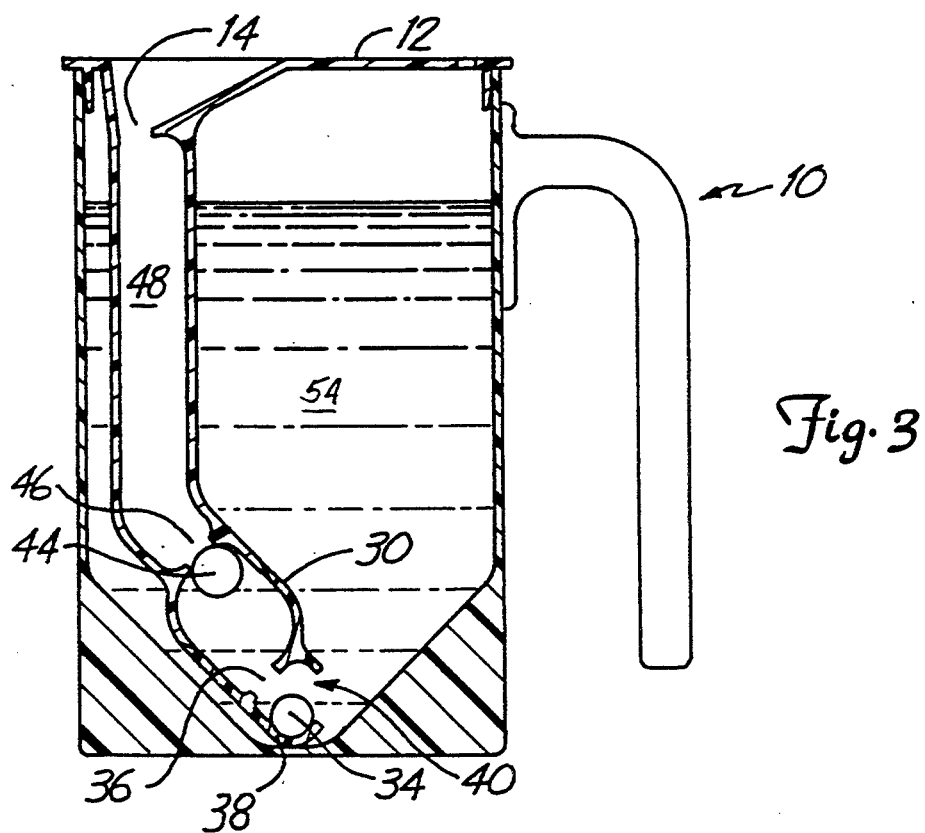
FIG. 3 is a cross-sectional view of the mug filled with fluid and standing in an upright position.

As seen in FIG. 3, flow channel 48 and metering chamber 30 are positioned such that metering chamber 30 is located immediately adjacent bottom surface 26 of mug 10. This preferred positioning maximizes the use of a fluid 54 within mug 10 by directing fluid 54 toward metering chamber 30. Metering chamber 30 will fill completely so long as the level of fluid 54 within interior lower portion 24 is higher than the top of metering chamber 30 when the mug 10 is in the upright position.

Also, given the symmetrical, conical shape of bottom surface 26, lid 12 may be positioned over rim 50 such that any desired orientation between orifice 14 and handle 18 is possible. This flexibility makes mug 10 convenient for all users (e.g., left-handed or right-handed users). Other shapes for the flow channel 48 and bottom surface 26, which direct fluid 54 toward opening 40 and into metering chamber 30 are also contemplated. For example, bottom surface 26 may have a narrow channel to receive metering chamber 30.

FIG. 3 shows a cross-sectional view of mug 10 in an upright position and filled with fluid 54. Lower valve ball 34 has a specific density greater than the specific density of fluid 54. In the upright position, lower valve ball 34 sinks and comes to rest against retaining wall 38. As a result, inlet orifice 36 is not obstructed by lower valve ball 34 and fluid 54 flows from interior lower portion 24 into metering chamber 30. The upper valve ball 44 has a specific density less than that of fluid 54. Therefore, as fluid 54 enters metering chamber 30, upper valve ball 44 floats on fluid 54 and seals against outlet orifice 46 when metering chamber 30 is filled. Fluid 54 is thereby prevented from entering flow channel 48.

Figure 4:
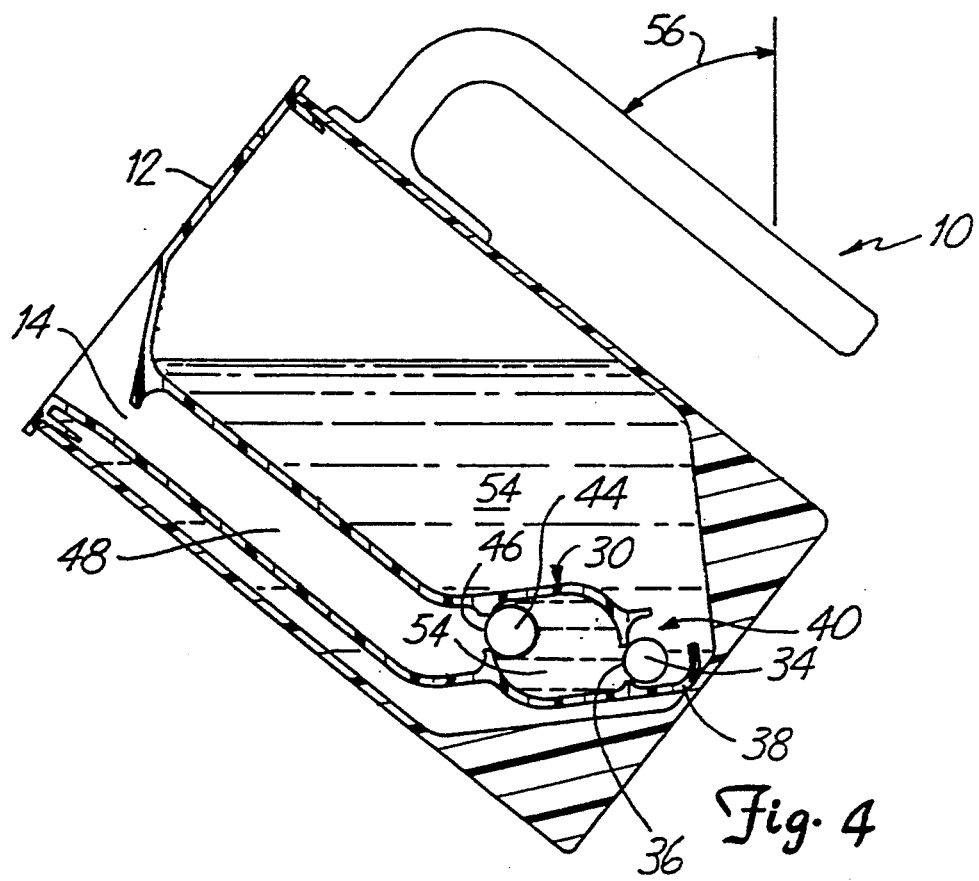
FIG. 4 is a cross-sectional view of the mug at a first tipping angle from the upright position.

FIG. 4 shows a cross-sectional view of mug 10 filled with fluid 54 and tilted at a first angle 56. At first angle 56, the force of gravity pulls lower valve ball 34 over inlet orifice 36. This positioning of lower valve ball 34 prohibits the flow of fluid 54 into metering chamber 30. Metering chamber 30 now contains a precise amount of fluid 54 that is to be dispensed to the user. Upper valve ball 44 remains in position over outlet orifice 46 thereby preventing fluid 54 in metering chamber 30 from entering liquid flow channel 48.

Figure 5:
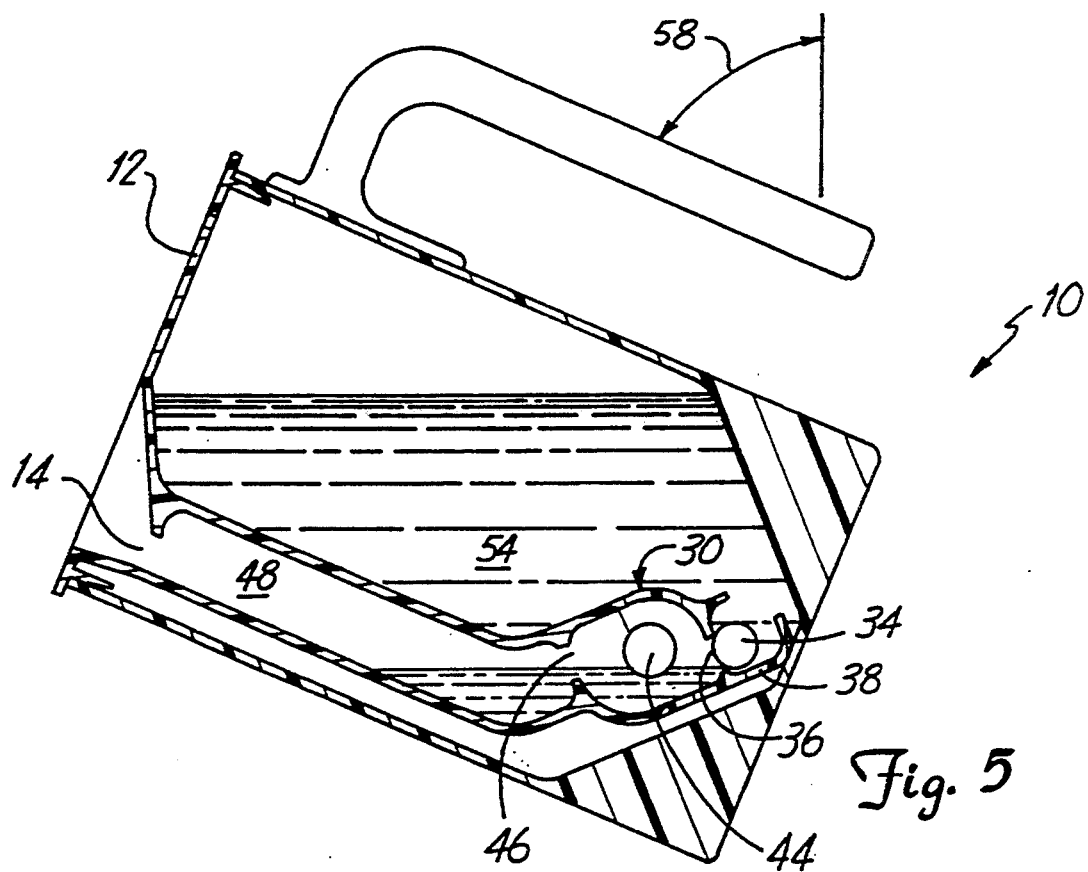
FIG. 5 is a cross-sectional view of the mug at a second tipping angle from the upright position.

FIG. 5 shows a cross-sectional view of mug 10 filled with fluid 54 and tilted at a second angle 58. At second angle 58, upper valve ball 44 is released from outlet orifice 46 and is floating on the remaining fluid 54 in metering chamber 30. Lower valve ball 34 remains positioned over inlet orifice 36. Under the force of gravity, fluid 54 exits metering chamber 30 and enters flow channel 48 through outlet orifice 46. Preferably, second angle 58 exceeds 45°, such that a user may move mug 10 around without altering the contents of metering chamber 30.

Figure 6:
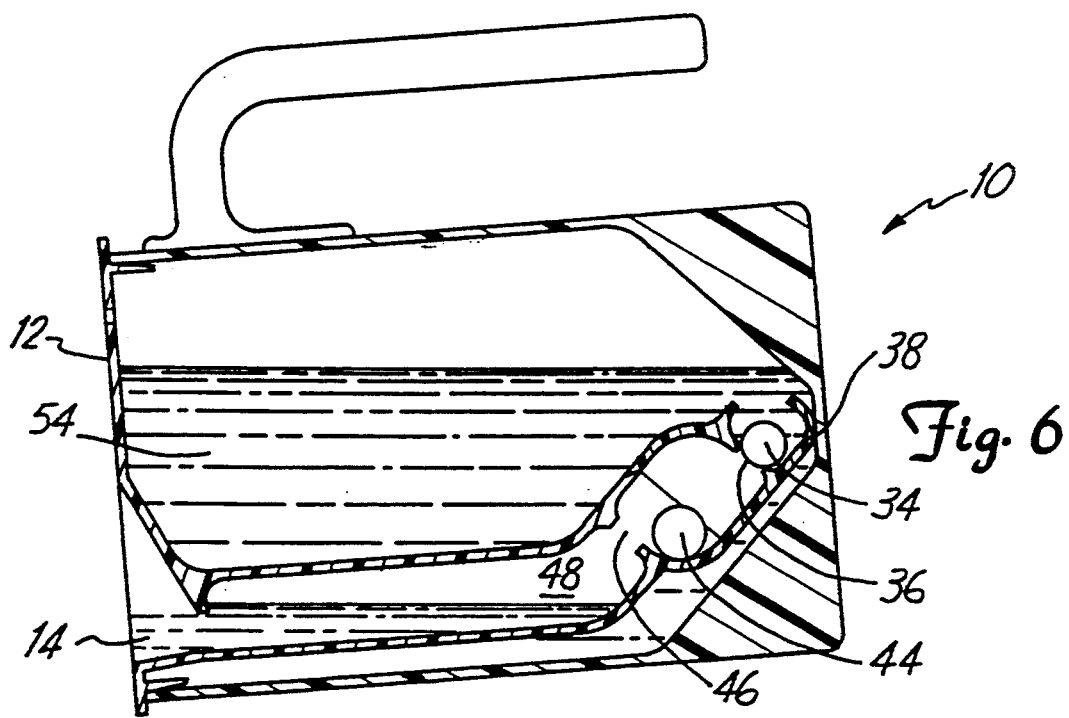
FIG. 6 is a cross-sectional view of the mug at an angle tipping slightly greater than 90° from the upright position.

FIG. 6 shows a cross-sectional view of mug 10 at an angle slightly greater than 90° from the upright position. At this angle, fluid 54 has completely drained out of metering chamber 30 and also is draining out of liquid flow channel 48 through orifice 14. Lower valve ball 34 continues to prevent additional fluid 54 from entering metering chamber 30 by sealing inlet orifice 36 under the force of gravity.

When fluid 54 has completely drained from liquid flow channel 48, the user may return mug 10 to the upright position. In this position, lower valve ball 34 will sink and come to rest against retaining wall 38 thereby allowing fluid 54 to enter metering chamber 30 under the force of gravity. Metering chamber 30 will fill with fluid 54 until upper valve ball 44 sealingly engages outlet orifice 46 as previously shown and discussed in FIG. 3.

The controlled volume dispensing mug 10 provides a precise amount of fluid 54 with each use. Fluid 54 fills metering chamber 30 whenever mug 10 is in an upright or nearly upright position. By supporting metering chambers of differing sizes, the invention enables the user to vary the amount of fluid 54 dispensed. The bi-valve construction in metering chamber 30 eliminates the possibility of air lock within metering chamber 30 as the chamber is not sealed until upper valve ball 44 floats into position over outlet orifice 46. Further, the amount of fluid 54 in metering chamber 30 is not determined by the rate at which the mug 10 is tipped. Metering chamber 30, therefore, will always be filled with a precise amount of fluid 54.

The controlled volume dispensing mug 10 facilitates the administration of liquids to users who have difficulty drinking from ordinary glasses. Many such users must be fed by another person such as a nurse, who must either control the drinking mug for the user, or spoon feed the liquid to the user. These users require for their drinking that small, uniform quantities of liquid be delivered from socially acceptable receptacles. Excess quantities of liquid are not accepted by the throat or can become ingested into the lungs, often causing adverse health conditions.

The present invention allows for flexible configurations that make using the mug more convenient for individual users. For instance, the mug may be easily modified for use by individuals who are predominantly right handed or predominantly left handed. In addition, the mug is designed to use the volume within the mug efficiently and to enable the users to drink in a socially acceptable manner. These features enable the mug to contribute greatly to the individual users self gratification, independence and self-sufficiency.

Although the present invention has been described with reference to preferred embodiments, workers skilled in the art will recognize that changes may be made in form and detail without departing from the spirit and scope of the invention.

What is claimed is:

1. A substantially closed mug for dispensing a predetermined volume of liquid through a lid of the mug, the mug comprising:

a liquid flow channel extending from an interior lower portion of the mug to the lid;

an upper end orifice located in the lid, the orifice communicating with the liquid flow channel; and a metering chamber located in the interior lower portion of the mug, the metering chamber having a volume corresponding to the predetermined liquid volume to be dispensed, the metering chamber having an upper valve and a lower valve, the upper valve communicating with the liquid flow channel, the lower valve communicating with the interior of the mug, wherein:

the lower valve includes a lower valve ball and an inlet orifice, the lower valve ball being formed of a material with a specific gravity greater than the specific gravity of the liquid such that the lower valve ball sinks in the liquid and allows liquid to enter the metering chamber via the inlet orifice, the lower valve being in an open position when the mug is in an upright position, the lower valve adapted to switch from an open position to a closed position when the mug is tilted at an angle equal to or greater than a first angle from the upright position; and the upper valve includes an upper valve ball and an outlet orifice, the upper valve ball being formed of a material with a specific gravity less than the specific gravity of the liquid such that the valve ball floats on the liquid and sealingly engages the outlet orifice when the metering chamber is full of liquid and the mug is tilted at less than a second angle from an upright position, the buoyancy of the upper valve ball causing the upper valve ball to dislodge from the outlet orifice and allow liquid to flow through the outlet orifice and into the liquid flow channel when the mug is tilted at an angle equal to or greater than the second angle, the second angle being greater then the first angle.

2. The mug of claim 1 wherein the lower portion includes a bottom surface shaped to direct the liquid to the inlet orifice of the metering chamber, the metering chamber positioned adjacent to the bottom surface.

3. The mug of claim 2 wherein the bottom surface has a conical shape.

4. The mug of claim 1 wherein the upper valve ball is positioned within the metering chamber.

5. The mug of claim 1 wherein the metering chamber is one of a series of chambers, each chamber having a different volume.

6. The mug of claim 1 wherein the orifice of the lid is selectably positionable relative to a handle on the mug to facilitate ease of use of the mug.

7. The mug of claim 1 wherein the second angle is greater than 45 degrees, thereby allowing the mug to be moved around and slightly tilted without the upper valve opening.

8. The mug of claim 1 further comprising a thermally insulated exterior.

9. The mug of claim 1 wherein the lower valve further comprises a retaining wall for maintaining the lower valve ball adjacent the inlet orifice.

10. A substantially closed mug for dispensing a predetermined volume of liquid through a lid of the mug, the mug being of the type having a liquid flow channel extending from a metering chamber located in an interior of the mug to a lid of the mug having an upper end orifice located in the lid, the upper end orifice communicating with the liquid flow channel, the metering chamber having an upper and a lower valve, the upper valve communicating with the liquid flow channel, the lower valve communicating with the interior of the mug, the mug comprising:

the lower valve defined by a lower valve ball and an inlet orifice, the lower valve ball being formed of a material with a specific gravity greater than the specific gravity of the liquid such that the lower valve ball sinks in the liquid and allows liquid to enter the metering chamber via the inlet orifice, the lower valve being in an open position when the mug is in an upright position, the lower valve adapted to switch from an open position to a closed position when the mug is tilted at an angle equal to or greater than a first angle from the upright position, and the upper valve defined by a upper valve ball and an outlet orifice, the upper valve ball being formed of a material with a specific gravity less than the specific gravity of the liquid such that the upper valve ball floats on the liquid and sealingly engages the outlet orifice when the metering chamber is full of liquid and the mug is tilted at less than a second angle from an upright position, the buoyancy of the upper valve ball causing the upper valve ball to dislodge from the outlet orifice and allow liquid to flow through the outlet orifice and into the liquid flow channel when the mug is tilted at an angle equal to or greater than the second angle, the second angle being greater than the first angle.

11. The mug of claim 10 wherein the lower portion includes a bottom surface shaped to direct the liquid to the inlet orifice of the metering chamber, the metering chamber positioned adjacent to the bottom surface.

12. The mug of claim 11 wherein the bottom surface has a conical shape.

13. The mug of claim 10 wherein the upper valve ball is positioned within the metering chamber.

14. The mug of claim 10 wherein the metering chamber is one of a series of chambers, each chamber having a different volume.

15. The mug of claim 10 wherein the orifice of the lid is selectably positionable relative to a handle on the mug to facilitate ease of use of the mug.

16. The mug of claim 10 wherein the second angle is greater than 45 degrees, thereby allowing the mug to be moved around and slightly tilted without the upper valve opening.

17. The mug of claim 10 further comprising a thermally insulated exterior.

18. The mug of claim 10 wherein the lower valve further comprises a retaining wall for maintaining the lower valve ball adjacent the inlet orifice.

* * * * *